US009259765B2

(12) United States Patent
Mayer et al.

(10) Patent No.: US 9,259,765 B2
(45) Date of Patent: Feb. 16, 2016

(54) MAIL RUN BALANCING USING VIDEO CAPTURE

(71) Applicant: Pitney Bowes Inc., Stamford, CT (US)

(72) Inventors: Paul Mayer, Sandy Hook, CT (US); Kenneth S Zaldo, Oxford, CT (US); David A Glowny, Milford, CT (US); Jeremy A Freed, Gridley, IL (US)

(73) Assignee: Pitney Bowes Inc., Stamford, CT (US)

( * ) Notice: Subject to any disclaimer, the term of this patent is extended or adjusted under 35 U.S.C. 154(b) by 250 days.

(21) Appl. No.: 13/720,186

(22) Filed: Dec. 19, 2012

(65) Prior Publication Data

US 2014/0169619 A1 Jun. 19, 2014

(51) Int. Cl.
*G06K 9/00* (2006.01)
*B07C 5/342* (2006.01)
*B07C 3/00* (2006.01)

(52) U.S. Cl.
CPC ................ *B07C 5/3422* (2013.01); *B07C 3/00* (2013.01)

(58) Field of Classification Search
CPC .................................................... B07C 5/3422
USPC ......................................................... 382/101
See application file for complete search history.

(56) References Cited

U.S. PATENT DOCUMENTS 6,405,172 B1 6/2002 Baker et al.
6,539,098 B1 3/2003 Baker et al.
6,819,777 B2 11/2004 Baker et al.
7,286,995 B2 10/2007 Mayer et al.
2003/0098265 A1* 5/2003 Steinmetz et al. ............ 209/584
2006/0015213 A1* 1/2006 Avant et al. ................... 700/224
2006/0131378 A1* 6/2006 Baker et al. ................... 235/375
2007/0129957 A1* 6/2007 Elliott et al. ...................... 705/1
2008/0008376 A1* 1/2008 Andel et al. ................. 382/141
2008/0264836 A1* 10/2008 Girnus et al. ................ 209/584
2008/0294474 A1* 11/2008 Furka ................................ 705/7
2009/0218262 A1* 9/2009 Bowers et al. ................ 209/584
2009/0307005 A1* 12/2009 O'Martin et al. ................. 705/1
2010/0111356 A1* 5/2010 Berger et al. ................ 382/101

* cited by examiner

*Primary Examiner* — Stephen R Koziol
*Assistant Examiner* — Delomia L Gilliard
(74) *Attorney, Agent, or Firm* — Michael J. Cummings; Charles R. Malandra, Jr.; Steven J. Shapiro

(57) ABSTRACT

A method and system for mail run balancing of critical documents on a sorter machine that comingles both critical and non-critical documents. A plan identifying a set of critical documents to be processed as part of a mail run is received at the sorter. The plan includes an individual identifier code for each critical document. Sets of critical and non-critical documents are sorted as part of the comingled mail run. A camera scans the documents for the individual identifier codes on the critical documents during sorting. The camera captures an image of the scanned critical documents. A list of scanned individual identifier codes of sorted critical documents is stored for later use, along with the captured images of the documents. The list of scanned individual identifier codes is compared to the identifier codes of the critical documents in the plan. Based on the comparison, a first comparison list of scanned identifiers that do not match any identifiers in the plan and a second comparison list of identifiers in the plan that are not matched to pieces scanned are generated. The first comparison list is reconciled with the second comparison list by, at least in part, displaying the captured images to assist in matching corresponding documents from the lists.

20 Claims, 2 Drawing Sheets

MAIL RUN BALANCING USING VIDEO CAPTURE

TECHNICAL FIELD

The present invention relates to confirming that high value mail items have been successfully processed on a mail sorting machine.

BACKGROUND OF THE INVENTION

Systems for mass producing mail pieces are well known in the art. Such systems are typically used by organizations such as government agencies, banks, insurance companies and utility companies for producing a large volume of specific mailings like benefit payment checks, billing statements, or promotional offers.

Mail pieces are typically processed in large groups called "mail runs." Several thousand related mail pieces are grouped together in a mail run, with similar types of processing and inserts. Mail runs are typically tracked and managed as a group, and mail runs are conventionally submitted to a delivery service for delivery as a group. In order to gain high volume discounts, it is desirable to comingle and sort mail from different mail runs. Thus, high-value critical mailings, such as government benefit checks, might be mixed with less important mail, such as purely informational notices.

Once a finished mail piece has been formed, it is typically stacked in preparation for transfer to a carrier service, such as the U.S. Postal Service. Often, in order to receive the aforementioned postal discounts, it is advantageous to sort the outgoing mail in accordance postal regulations using known sorting machines, such as the Olympus sorting machines available from Pitney Bowes Inc. Most postal authorities offer large discounts to mailers willing to organize/group mail into batches or trays having a common destination. Typically, discounts are available for batches/trays containing a minimum of two hundred (200) or so mailpieces.

Mailpiece sorters are often employed by service providers, including delivery agents, e.g., the United States Postal Service USPS, entities which specialize in mailpiece fabrication, and/or companies providing sortation services in accordance with the Mailpiece Manifest System (MMS).

Prior to transfer to the delivery service, completed mail runs are typically checked for quality and completeness. Because of the high volume of mail that is handled, occasionally a document submitted to the mail production equipment for processing cannot be accounted for at the output end. The unaccounted for mail pieces may have been mishandled, damaged, destroyed, or misplaced.

There are different costs associated with unaccounted for mail pieces. For example, one cost is the expense of resubmitting and reprocessing the mail piece to ensure that the recipient gets the communication. Another cost may be harm caused if a missing document was accidentally stuffed into the wrong envelope and was sent to the wrong recipient. It is also possible that a recipient may not receive their intended mail, or that they might receive two of the same pieces. Depending on the particular circumstances, mailers will weigh the costs and risks and determine how carefully to balance mail runs. For some types of mail runs, failure to balance mail piece accounts may not be significant. As an example, for a mailing that merely included a department store coupon, a mailer might decide to send out an unbalanced mail run. In this case, the mailer is risking the cost that a recipient might not receive an intended coupon, or perhaps get an extra coupon. This cost most likely would not justify redoing the entire mail run. Rather, the unaccounted mail piece might be reprinted and sent, and the balancing failure could be ignored.

However, if the mail run included financial, medical, or other sensitive information, a mailer may need 100% balancing before submitting a mail run for delivery. The potential harm, and loss of customer trust, if sensitive information were not received, or sent to the wrong recipient, could be very damaging. In practice, some mailers have been known to bear the costs of completely redoing the mail runs when perfect balancing cannot be achieved.

With balancing considerations in mind, mailers want to get maximum postal discounts, and the best way to do that might be to comingle mail runs of critical documents with mail runs of less important documents. However, the effort to balance an entire comingled set of mail run may be prohibitively difficult and time consuming using conventional methods. Two methods for balancing are (1) balancing by count and (2) balancing by identifier. Those two methods are both inadequate for dealing with the large comingled mail set that includes both critical and non-critical mail runs.

Balancing by count is accomplished by comparing the machine counters at the end of the run with an expected count of mail pieces. This approach is complicated when reject pieces are often run through the sorter more than once to retry them. Doubled pieces also create special situations. A "double" occurs when two mail pieces stick together and are processed together in the sorter as one piece. Most sorters attempt to detect doubles, and in such cases the system can correct the count. However, undetected double feeds create a situation where it is often impossible to find the missing mail piece.

The drawback of the balancing by count approach is that there is little that can be done when the counts do not match. This problem becomes particularly acute when large numbers of mail pieces are comingled. In such cases hundreds of thousands of documents could be run through the sorter in a single pass. If the counts are off then there is little choice but to rerun the entire set of mail. If the critical "high value" documents only represent a small fraction of the overall mailing this could be an onerous burden. Since balance by count is based on the final counts it cannot be attempted until the sorter run is completed. This jeopardizes the timeliness of sorter processing since one is never sure whether one will fail to balance and how long it will take to remediate the mail.

Balancing by identifier is accomplished by putting a unique identifier on each piece and having the sorter read that unique identifier off of each piece fed. The identifier might be in the form of a barcode or it might be in the form of a keyline string that is read by an optical character recognition (OCR) system.

Using this method, at the end of the run, the operator can print out a set of reports that list the identifiers not accounted for. The operator must then go through the reject pockets and other pockets on the sorter to find each mail piece.

The biggest issue with the balancing by identifier technique occurs when one identifier is accidentally read as another identifier (i.e. a substitution error). An example of a substitution error might occur if the OCR read a keyline of "12" as a '1Z". In this case one identifier ("1Z") might appear to have been seen twice and another identifier ("12") might appear to be missing. The problem with this is that all or some of these pieces involved would have been sorted to their respective sorter pockets, and would be hard to manually find.

Aside from the fact that it does not deal well with substitution errors this technique also has the disadvantage that it usually involves manual manipulation of the mail piece.

Pieces where the identifier cannot be read must be out-sorted, so they can be physically collected and "checked off" the list of unaccounted for pieces.

Also this technique is still best applied when the sorter run is complete. There are two reasons for this. The first is that it is because it is confusing to be physically collecting rejects off of the sorter while it is actively running. The second is that there is little point of printing off a report and checking off the spoils when one has not completed the run.

SUMMARY OF THE INVENTION

This invention solves the problem by employing video capture to capture images of all high value mail pieces in a mailing. For a sorter comingling multiple jobs, it is only necessary to capture images of those mail pieces that that are deemed high value or critical documents. These images are stored in a data base along with any identifiers read on the pieces via OCR keyline reader or barcode.

The set of identifiers seen in the run is compared to the set of identifiers known to be in the plan. Two lists are created based on this comparison: (1) a list of pieces seen but which have not been matched to items in the plan; and (2) a list of identifiers in the plan which could not be matched to pieces seen.

A display is provided to compare and match items in the two lists. As items are matched they are removed from the lists. Images of any of the pieces involved may also be displayed. This allows the operator to easily confirm that a given piece matches a given identifier.

If for some reason the operator must actually locate the physical mail piece corresponding to an item in the piece list he/she can do so since the system can display the current location of the piece (i.e. the piece is in pocket N and is M pieces from the end).

In the preferred embodiment, the invention is directed to a method for mail run balancing of critical documents on a sorter machine that comingles both critical and non-critical documents. A plan identifying a set of critical documents to be processed as part of a mail run is received at the sorter. The plan includes an individual identifier code for each critical document. Sets of critical and non-critical documents are sorted as part of the comingled mail run. A camera scans the documents for the individual identifier codes on the critical documents during sorting. The camera captures an image of the scanned critical documents. A list of scanned individual identifier codes of sorted critical documents is stored for later use, along with the captured images of the documents. The list of scanned individual identifier codes is compared to the identifier codes of the critical documents in the plan. Based on the comparison, a first comparison list of scanned identifiers that do not match any identifiers in the plan and a second comparison list of identifiers in the plan that are not matched to pieces scanned are generated. The first comparison list is reconciled with the second comparison list by, at least in part, displaying the captured images to assist in matching corresponding documents from the lists. In a preferred embodiment, the camera uses optical character recognition to read the identifier codes on the critical documents.

The preferred embodiment also operates when the mail run is a comingled mail run comprising both critical and non-critical sets of documents. For non-critical documents, the steps of scanning, capturing, storing, comparing, generating and reconciling are not done. The steps to be performed on a set of critical documents are activated by an operator via a user interface control.

In a preferred embodiment, the process of generating the first comparison list further includes documents with unreadable identifier codes and identifiers that were found twice in the scanning step. The second comparison list may further include identifiers that were found twice in the scanning step.

A reprint list may be generated after the step of reconciling has identified documents that were not sorted. Also reconciling may begin before the completion of the sorting.

DETAILED DESCRIPTION

Figure 1:
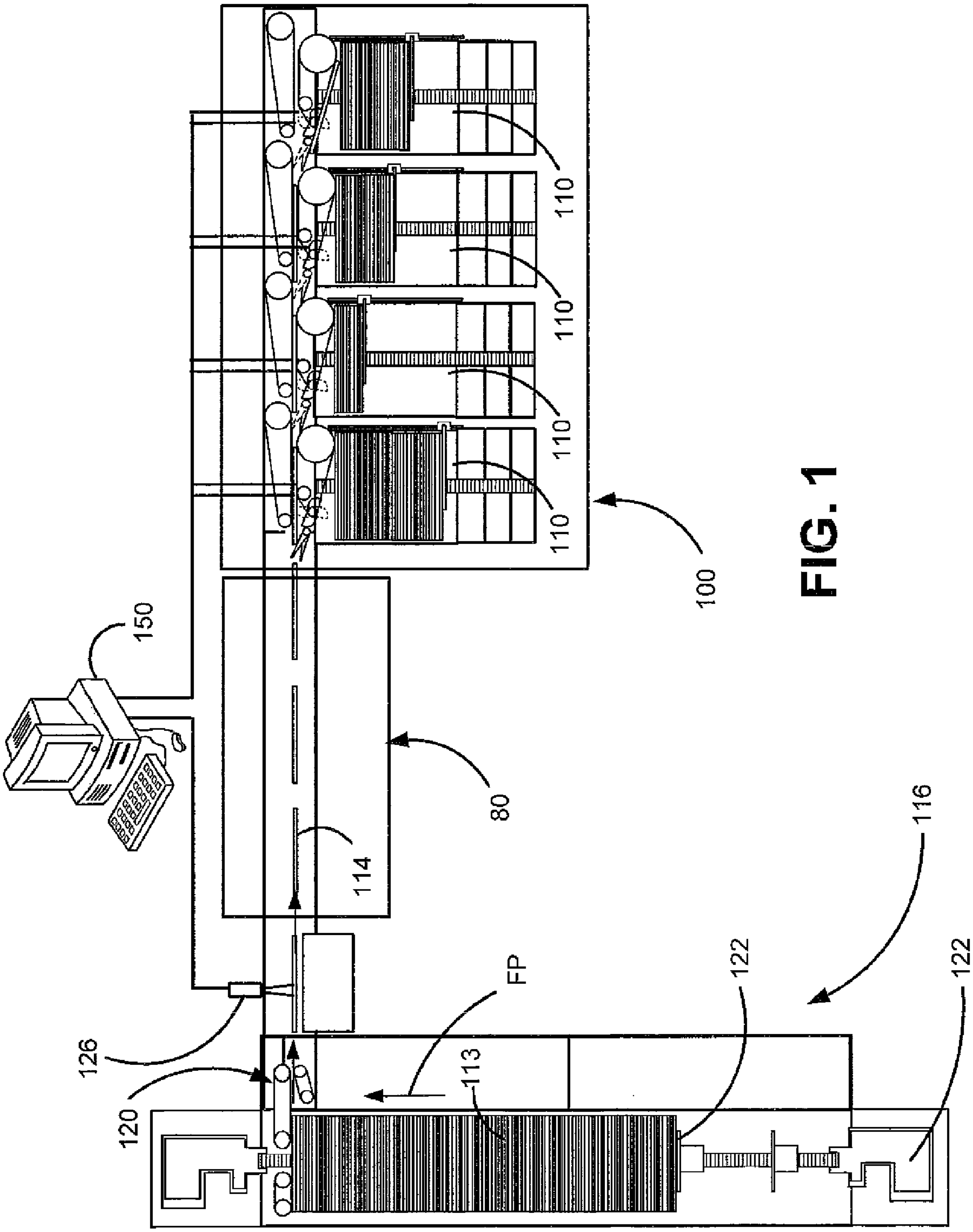
FIG. 1 shows an exemplary mail sorter machine arrangement that can be used with the invention.

FIG. 1 shows an exemplary sorter device on which the disclosed method and system can be practiced. In FIG. 1, a plurality of mailpieces are fed, scanned and sorted by a multi-tiered sorting system 100. The principle modules of the multi-tiered sorting system 100 include: a sheet feeding apparatus 116, a scanner 126, a Level Distribution Unit (LDU) 80, multi-tiered stacker/sorter pockets 110, and a control computer 150. With respect to the latter, the overall operation of the multi-tiered stacker/sorter 100 is coordinated, monitored and controlled by the system controller 150. While the sorting system 100 is described and illustrated as being controlled by a single system processor/controller 150, it should be appreciated that each of the modules 116, 126, 80 and 110 may be individually controlled by one or more processors. Hence, the system controller 150 may also be viewed being controlled by one or more individual microprocessors.

The sheet feeding apparatus 116 accepts a stack 113 of individual mailpieces 114 between a plurality of singulating belts 120 at one end and a support blade 122 at the other end. The support blade 122 holds the stack 113 mailpieces 114 in an on-edge, parallel relationship while a central conveyance belt moves the support blade 122, and consequently, the stack 113 of mailpieces 114, toward the singulation belts 120 in the direction of arrow FP.

Once singulated, the mailpieces 114 are conveyed on-edge, in a direction orthogonal to the original feed path FP of the mailpiece stack. That is, each mailpiece 114 is fed in an on-edge lengthwise orientation across or passed a scanner camera 126 which identifies and reads specific information on the mailpiece 114 for sorting each mailpiece 114 into a sortation bin 110. Generally, the scanner 126 reads the postal or ZIP code information to begin the sorting algorithm. The scanner 126 may also be used to identify the type of mailpiece/parcel, e.g., as a postcard, magazine, which may be indicative of the weight or size of the mailpiece 114 being sorted. In the preferred embodiment scanner 126 is also a high speed camera that is capable of taking a digital image of a moving mail piece. A variety of line scan camera devices are known, and are readily available, to allow an image to be integrated as a mail piece moves past. Any camera capable of producing a 200 DPI, or similar density, image of a moving mail piece will suffice.

The mail run balancing described herein is preferably carried out on the control computer 150, however a separate computer and terminal may be used for this purpose. The control computer 150 may be any suitable desktop or laptop computer having a processor and memory, and being programmable to implement the required sorting and balancing steps and algorithms.

The balancing mechanism involves two steps. The first step is the document processing step. This is carried out at the sorter 100. The second step is the balancing step this could be carried out at the sorter controller 150 or it could be done at a separate workstation. Further this second step can be started before the first step is complete and the second step can potentially be completed before the first step if all of the critical documents for that day have be processed in the first step (i.e. the first step can continue to comingle non critical documents after the critical ones.)

Figure 2:
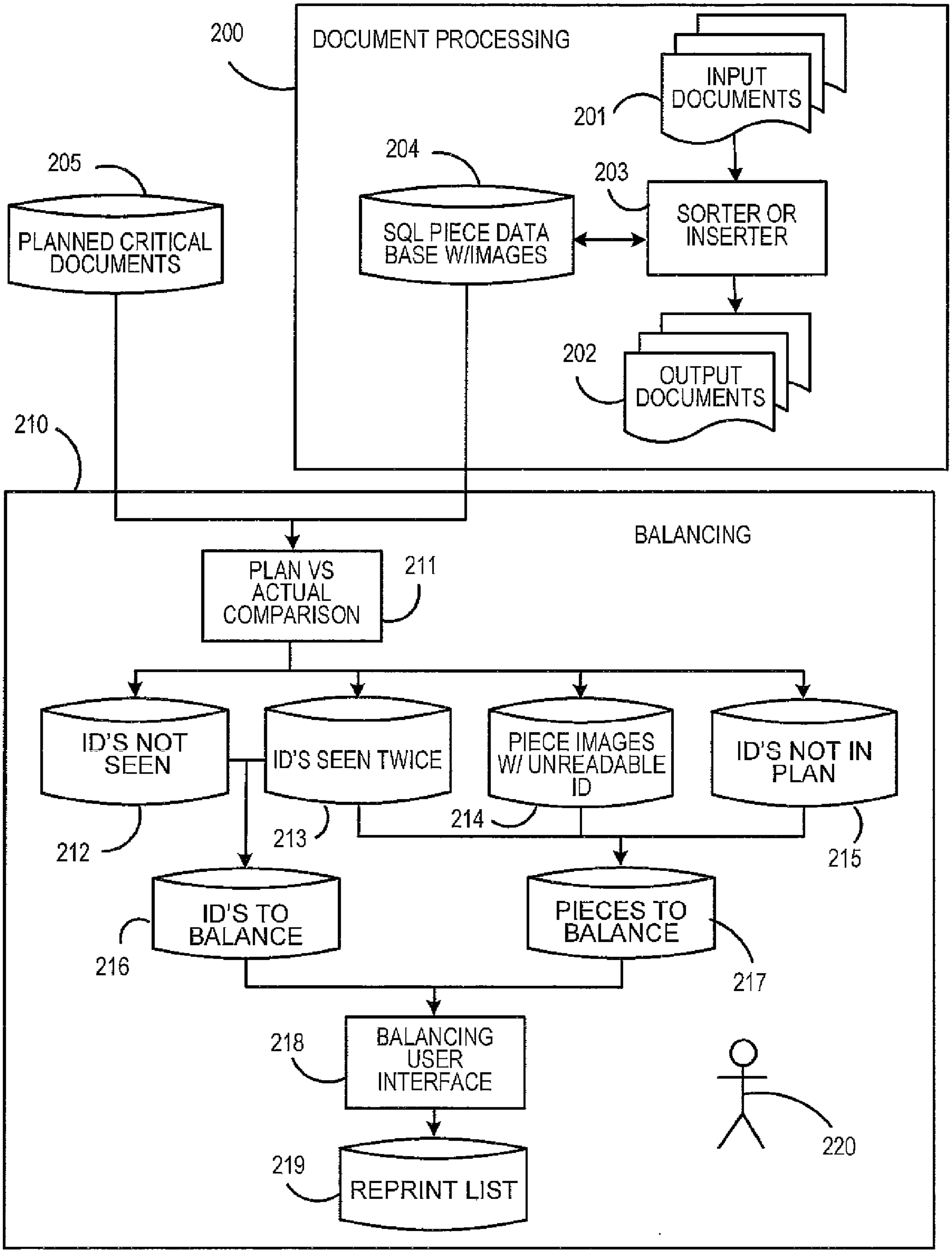
FIG. 2 shows an exemplary processing flow for mail run balancing on a sorter.

Referring to FIG. 2, the preferred process and system for balancing the sorted mail is as follows. A plan 205 of all of the critical documents in the mailing or job is received and stored in controller 150. This typically is a list of identifiers that are to be located on the mail pieces. This plan might also include page counts, weights, names and addresses (to assist the operator in double checking the piece against the image). The input documents 201 are produced and input to the sorter machine (or possibly an inserter machine having a sortation module) at step 203.

The input documents 201 is run through the sorter, producing the sorted output documents 202, preferably sorted into their respective bins 110, in accordance with postal discount requirements. Not all of the batches of material run during this step need be critical documents. Preferably, some batches are non-critical documents that are being comingled to achieve higher volumes. In this case, the equipment includes an interface for identifying what batches include critical documents. In one embodiment, sorter controller 150 interface includes an icon that can be flagged what a particular batch, or run, of envelopes is composed of critical documents. In another embodiment, the envelopes of the critical documents can include a special code or marker which is detectable by the machine to automatically determine which mail items are critical. The means for distinguishing critical documents from non-critical items can be similar to the way in which one might use known techniques to identify some batches as being billed to different particular accounts.

At step 204, for those documents that are identified as critical, the processing equipment will capture an image, using camera 126, of each and every piece and write it to a data base. Additionally for each piece fed the processing equipment will also record any identifier seen on the piece to the data base. In the preferred embodiment, an SQL database resident on the control computer 150 is used. For each critical document processed the sorter controller 150 will also record the final location or pocket 110 number for each piece to the data base.

The sorter 100 can be configured to permit multiple attempts at reading an identifier. If that option was enabled, images and piece identifiers would not be written to the data base for pieces where no identifier is read. This will give the operator the ability to rerun those pieces to give the scanner 126 another chance to read the identifier markings. The operator would initially turn this option on and run mail and then would turn the option off before rerunning the rejects.

For balancing at step 211, the sorter controller will run a comparison of the plan 205 against the piece data base 204. This comparison would yield two distinct lists of pieces and IDs.

One list is a list 216 of IDs to be balanced. This list would typically be in ID order. This is comprised of: ID s not seen in the processing step but which were in the plan (212); and unique IDs that appeared twice during the run (213). Thus if a given identifier appeared twice during the run it would occur once within this list.

A second list 217 includes pieces seen but which are not correctly associated with IDs. This list would be displayed by either ascending or descending order of occurrence on the machine. The list would be comprised of: pieces which were read but the IDs read were not in the plan (215); pieces where the ID could not be read (214); and pieces where the IDs read were seen by the sorter more than once (213). Note that pieces like this will typically be added in groups of two pieces or greater.

A human interface 218, preferably at control computer 150, displays the two lists (216 and 217) on the screen. The interface is configured to allow the operator to select pairs of items from different lists and "match" them. Once an item is matched the entries from the two lists would be removed. In the preferred embodiment, the operator selects an item from a list and displays an image of that piece to assist in the identification of the piece. The interface is also preferably configured to display the current location (i.e. what bin the piece was sent to and were in that bin relative to the beginning the piece is). This would allow the operator to locate the physical piece should there be questions about the piece. Once all of the items in the lists have been matched up the run would be considered to be balanced.

Optionally the customer may allow operators to produce a reprint list, step 219. This would be a list of IDs that were not paired with pieces. The operator should also find the corresponding physical piece and destroy it.

In summary, the advantages of the approach described above are as follows. Balancing can be done without manual intervention in many cases. Pieces where the Identifier cannot be read do not have to be outsorted but can instead be sent to their normal pocket. Large batches of mail can be comingled where only some of the mail pieces are considered "high-value" and only the high value documents need be balanced. Balancing can be started before the end of first pass. Balancing can be completed once all of the critical documents are fed into the sorter without waiting for the pass/job to be completed. There is a viable and efficient way to deal with substitution errors. This is particularly critical for cases where the identifier is encoded in an OCR keyline instead of a barcode as substitution errors can be more prevalent in these cases.

Although the invention has been described with respect to preferred embodiments thereof, it will be understood by those skilled in the art that the foregoing and various other changes omissions and deviations in the form and detail thereof may be made without departing from the spirit and scope of this invention.

What is claimed is:

1. A method for mail run balancing of critical documents on a sorter machine that comingles both critical and non-critical documents, the method including:

receiving a plan identifying a set of critical documents to be processed as part of a mail run, the plan including an individual identifier code for each critical document;

sorting sets of critical and non-critical documents on the sorter as part of the comingled mail run;

scanning with a camera for the individual identifier codes on the critical documents during sorting;

capturing, with the camera, an image of the scanned critical documents;

storing a list of scanned individual identifier codes of sorted critical documents;

storing the captured images in association with the scanned individual identifier codes;

comparing the list of scanned individual identifier codes to the identifier codes of the critical documents in the plan;

generating, based on the comparison, a first comparison list of scanned identifiers that do not match any identifiers in the plan and a second comparison list of identifiers in the plan that are not matched to pieces scanned;

reconciling the first comparison list with the second comparison list by, at least in part, displaying the captured images to assist in matching corresponding documents from the lists.

2. The method of claim 1 wherein the step of scanning with the camera further includes using optical character recognition to read the identifier codes on the critical documents.

3. The method of claim 1 wherein the mail run is a comingled mail run comprising both critical and non-critical sets of documents.

4. The method of claim 3 wherein the steps of scanning, capturing, storing, comparing, generating and reconciling are only done on sets of critical documents, and not on sets of non-critical documents.

5. The method of claim 4 wherein steps to be performed on a set of critical documents are activated by an operator via a user interface control.

6. The method of claim 1 wherein the step of generating the first comparison list further includes documents with unreadable identifier codes.

7. The method of claim 1 wherein the step of generating the first comparison list further includes identifiers that were found twice in the scanning step.

8. The method of claim 1 wherein the step of generating the second comparison list further includes identifiers that were found twice in the scanning step.

9. The method of claim 1 further including a step of generating a reprint list after the step of reconciling has identified documents that were not sorted.

10. The method of claim 1 wherein the step of reconciling begins before the completion of the sorting.

11. A mail sorting system including a capability for mail run balancing of critical documents, the system including:

a sorter having a camera for scanning individual identifier codes on critical documents during sorting and capturing an image of the scanned critical documents;

a control computer coupled to the sorter and camera and having a processor and a memory, the control computer configured to: (a) receive a plan identifying a set of critical documents to be processed as part of a mail run, the plan including an individual identifier code for each critical document; (b) store a list of scanned individual identifier codes of sorted critical documents; (c) store the captured images in association with the scanned individual identifier codes; (d) compare the list of scanned individual identifier codes to the identifier codes of the critical documents in the plan; (e) generate, based on the comparison, a first comparison list of scanned identifiers that do not match any identifiers in the plan and a second comparison list of identifiers in the plan that are not matched to pieces scanned; and (f) display the first comparison list with the second comparison list on a display screen for reconciliation; and (g) displaying the captured images on the display screen to assist in matching corresponding documents from the lists.

12. The system of claim 11 wherein the camera and control computer are configured to use optical character recognition to read the identifier codes on the critical documents.

13. The system of claim 11 wherein sorter is configured to comingled mail run comprising both critical and non-critical sets of documents.

14. The system of claim 13 wherein the control computer is configured to only perform mail run balancing on sets of critical documents, and not on sets of non-critical documents.

15. The system of claim 14 wherein the control computer includes a user interface by which an operator can activate mail run balancing to be performed on sets of critical documents.

16. The system of claim 11 wherein the control computer is configured to generate the first comparison list to include documents with unreadable identifier codes.

17. The system of claim 11 wherein the control computer is configured to generate the first comparison list to further includes identifiers that were found twice during scanning.

18. The system of claim 11 wherein the control computer is configured to generate the second comparison list to include identifiers that were found twice in the scanning step.

19. The system of claim 11 wherein the control computer is configured to generate a reprint list after reconciling has identified documents that were not sorted.

20. The system of claim 11 wherein the control computer is configured to allow reconciling to begin before the completion of the sorting.

* * * * *